United States Patent [19]

Yong

[11] Patent Number: 4,558,316

[45] Date of Patent: Dec. 10, 1985

[54] ELECTRICAL SUPERVISORY CONTROL AND DATA ACQUISITION SYSTEM

[76] Inventor: Fui K. Yong, 6/27 Lanark St., Clayton, Victoria 3168, Australia

[21] Appl. No.: 593,183

[22] PCT Filed: Apr. 10, 1981

[86] PCT No.: PCT/AU81/00040

§ 371 Date: Dec. 2, 1981

§ 102(e) Date: Dec. 2, 1981

[87] PCT Pub. No.: WO81/02962

PCT Pub. Date: Oct. 15, 1981

Related U.S. Application Data

[63] Continuation-in-part of Ser. No. 326,627, Dec. 2, 1981, abandoned.

[30] Foreign Application Priority Data

Apr. 10, 1980 [AU] Australia .............................. PE3076

[51] Int. Cl.$^4$ .............................................. H04Q 9/00
[52] U.S. Cl. ........................... 340/825.06; 340/825.63; 340/870.24
[58] Field of Search ....................... 340/825.06, 825.07, 340/825.63, 825.64, 825.57, 521, 52 F, 825.52, 825.54, 870.24, 870.19, 825.37; 307/10 R

[56] References Cited

U.S. PATENT DOCUMENTS

| | | | |
|---|---|---|---|
| 3,440,607 | 4/1969 | Abramson . | |
| 3,611,361 | 10/1971 | Gallichotte . | |
| 3,905,008 | 9/1975 | Hageman | 340/825.59 |
| 3,991,413 | 11/1976 | Berger | 340/537 |
| 4,077,030 | 2/1978 | Helava | 340/870.39 |
| 4,131,882 | 12/1978 | Hollabaugh et al. | 340/825.06 |
| 4,196,417 | 4/1980 | Fasching et al. | 340/870.24 |
| 4,227,181 | 10/1980 | Brittain | 340/825.63 |
| 4,311,986 | 1/1982 | Yee | 340/825.63 |
| 4,327,441 | 4/1982 | Bradshaw | 340/825.63 |
| 4,359,721 | 11/1982 | Galvin et al. | 340/537 |
| 4,394,655 | 7/1983 | Wynne et al. | 340/825.37 |
| 4,451,826 | 5/1984 | Fasching | 340/825.07 |
| 4,468,664 | 8/1984 | Galvin | 340/825.54 |

FOREIGN PATENT DOCUMENTS

| | | |
|---|---|---|
| 490724 | 3/1976 | Australia . |
| 2215609 | 10/1973 | Fed. Rep. of Germany . |
| 610167 | 3/1979 | Switzerland . |
| 1427133 | 3/1976 | United Kingdom . |
| 1503006 | 3/1978 | United Kingdom . |
| 2041592 | 10/1980 | United Kingdom . |

Primary Examiner—Donald J. Yusko

[57] ABSTRACT

An electrical control system which comprises: a master station (2) and a plurality of receiver stations (4) connected thereto by a bus, (6), the master station including generating means (20, 22) for generating control signals (18) which are applied to said bus and to which said receiver stations are responsive, the control signals comprising a repetitive series of signal frames, each frame including a reset pulse (18) and a plurality of other pulses, the master station including control means (14) which causes selectable alteration of a characteristic of said other pulses, and wherein each of said receiver stations is addressed following receipt of a predetermined number of said other pulses, said receivers being responsive to said selectable characteristic of the other pulses whereby information is transmitted to addressed receiver stations in accordance with operation of said control means, whereby data and address information are constituted in the same pulses. The system may further include circuitry which permits the receiver being addressed to transmit information to the master station. The system would have wide applications, for instance, in nurse paging systems in hospitals.

6 Claims, 13 Drawing Figures

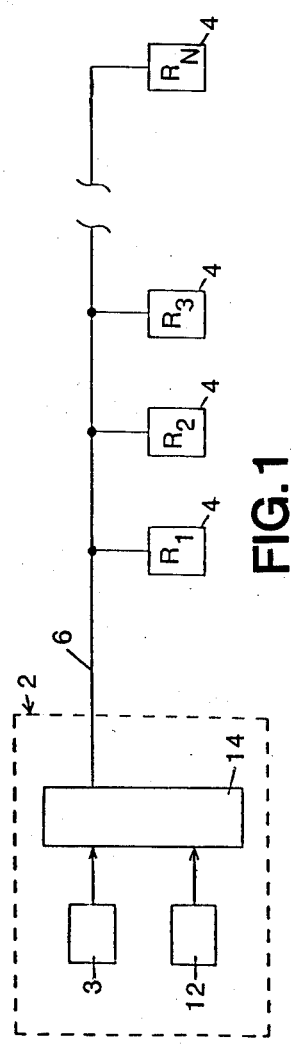
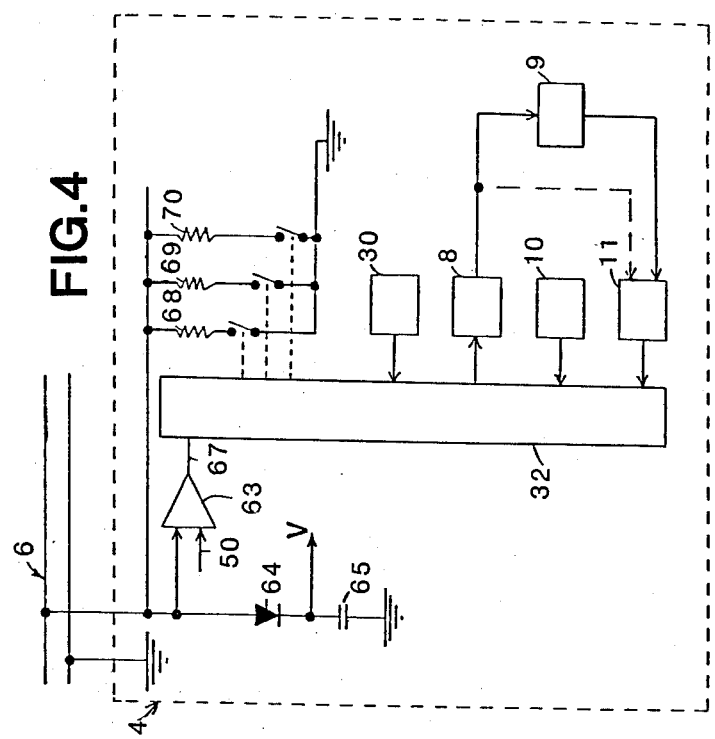
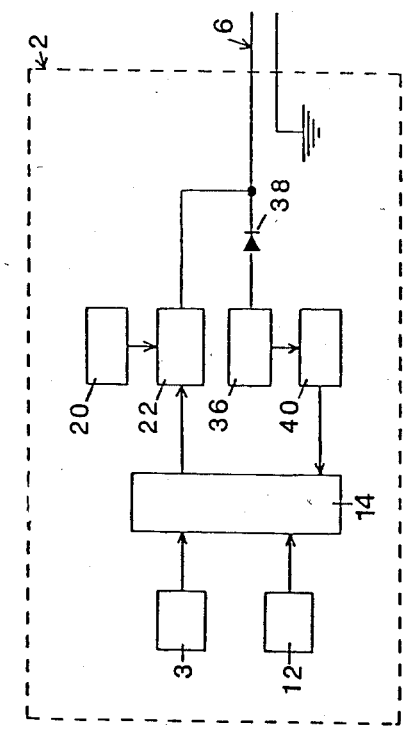

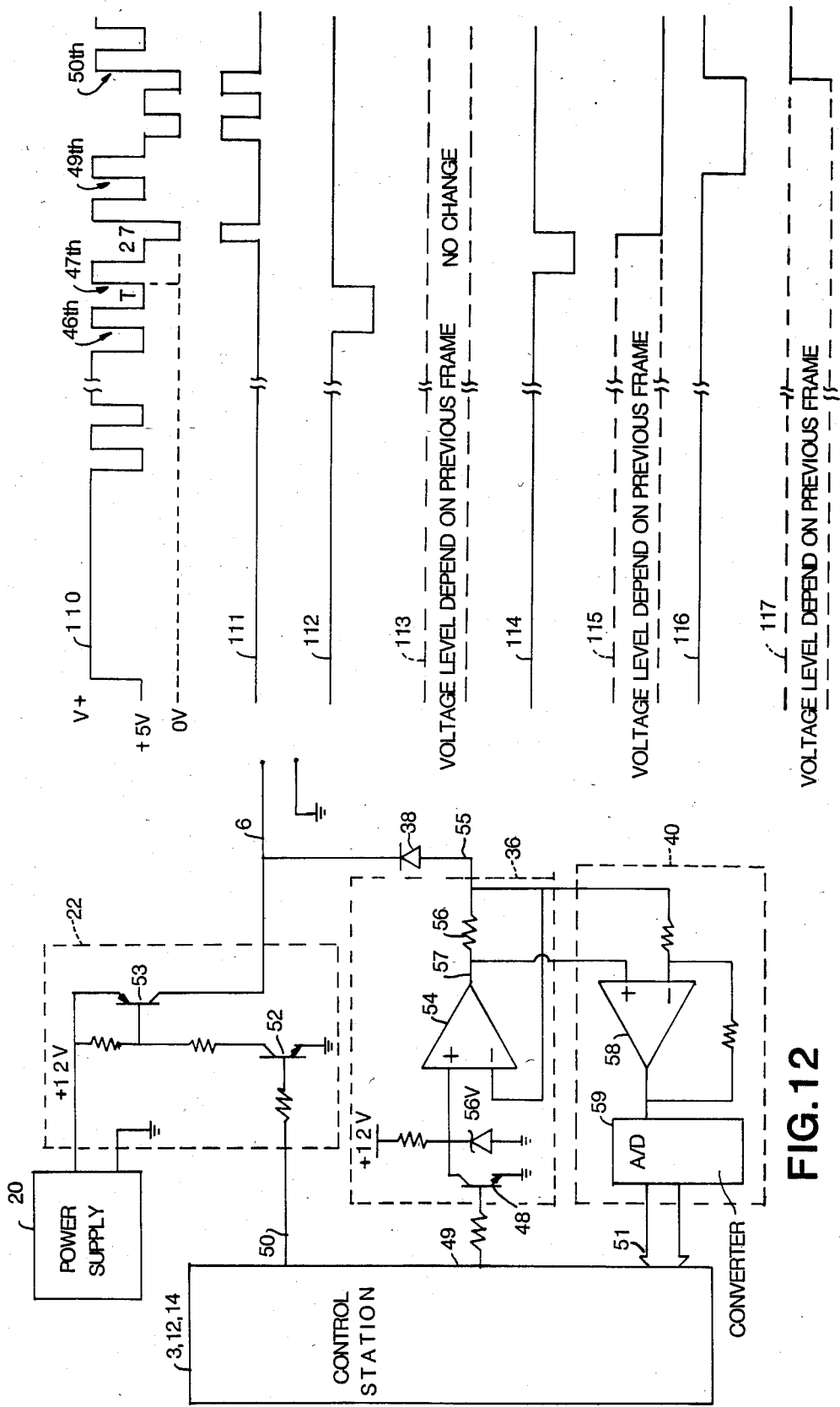

ELECTRICAL SUPERVISORY CONTROL AND DATA ACQUISITION SYSTEM

This is a continuation-in-part of co-pending application Ser. No. 326,627 filed Dec. 2, 1981, abandoned.

This invention relates to a system for remote control of a plurality of electrical devices, the system having a master control station which governs the operation of a plurality of receiver stations which in turn are coupled to control and/or monitor electrical devices. The electrical devices could comprise any device that may be controlled or monitored by electrical signals. For instance, the electrical devices could comprise air conditioning controls, lighting switches, safety devices, displays, burglar alarms or the like.

U.S. Pat. No. 4,227,181 to Brittain discloses a time division multiplex communication system whereby the sync signal is voltage amplitude modulated, command and tell back signals are pulse width modulated and each time slot is assigned as either a command or tell back time slot.

U.S. Pat. No. 3,905,008 to Hagemann discloses an electronic signalling system from a consul station to a plurality of sensing units whereby voltage polarity and duration are used for signalling. The position of the sensing unit determines its address.

Other patents of interests are Australian Pat. No. 498,812 and Specification No. 22657/77 and U.K. Pat. No. 2,041,592A.

According to the present invention there is provided an electrical control system comprising a master station and a plurality of receiver stations connected thereto by a bus, said master station including generating means for generating control signals which are applied to said bus and to which said receiver stations are responsive, said control signals comprising a repetitive series of signal frames each frame including a reset pulse and a plurality of other pulses, said master station including control means which causes selectable alteration of a characteristic of said other pulses and wherein each of said receiver stations is addressed following receipt of a predetermined number of said other pulses, said receivers being responsive to said selectable characteristic of the other pulses whereby information is transmitted to addressed receiver stations in accordance with operation of said control means. Said receiver station when addressed also varies the bus impedance in accordance with its status and input.

In the preferred arrangement each signal frame commences with a reset pulse which is then followed by a predetermined or varying number of said other pulses which are used both for addressing the various receivers and for transmitting information to the various receivers.

Preferably further, each receiver station has at least one input, one output and three electrical impedances which are coupled to or not coupled to the bus line in accordance with the conditions of the output status, the input and receiver status at that receiver during the signalling period which occurs following addressing of that receiver. The master station includes a monitor coupled to the bus line and being operable to determine the impedance coupled to the bus line and assign logical value to the output status, input and status of that receiver responsive to that address, in accordance with the impedance coupled to the bus line. In the preferred arrangement, the three electrical impedances are resistances of value R for the receiver status, R/2 for the input and R/4 for output status.

In the preferred arrangement the master station transmits command output information to the selected remote receiver by varying the duration of the period to the next address pulse. In the alternative arrangement, the master station transmits command output information to the selected remote receiver by varying the number of zero pulses compared to the reset and address pulses which are at a non zero datum, during the period before the next address pulse.

The invention will now be further described with reference to the accompanying drawings, in which:

FIG. 1 is a schematic representation of a system in accordance with the invention;

FIG. 2 is a block diagram of the master station;

FIG. 4 is a block diagram of the preferred remote receiver station;

FIG. 12 is a detailed schematic diagram of the modified master station for the alternative remote receiver station;

FIG. 13 illustrates various signal waveform useful in understanding the operation of the alternative remote receiver station.

Figure 3:
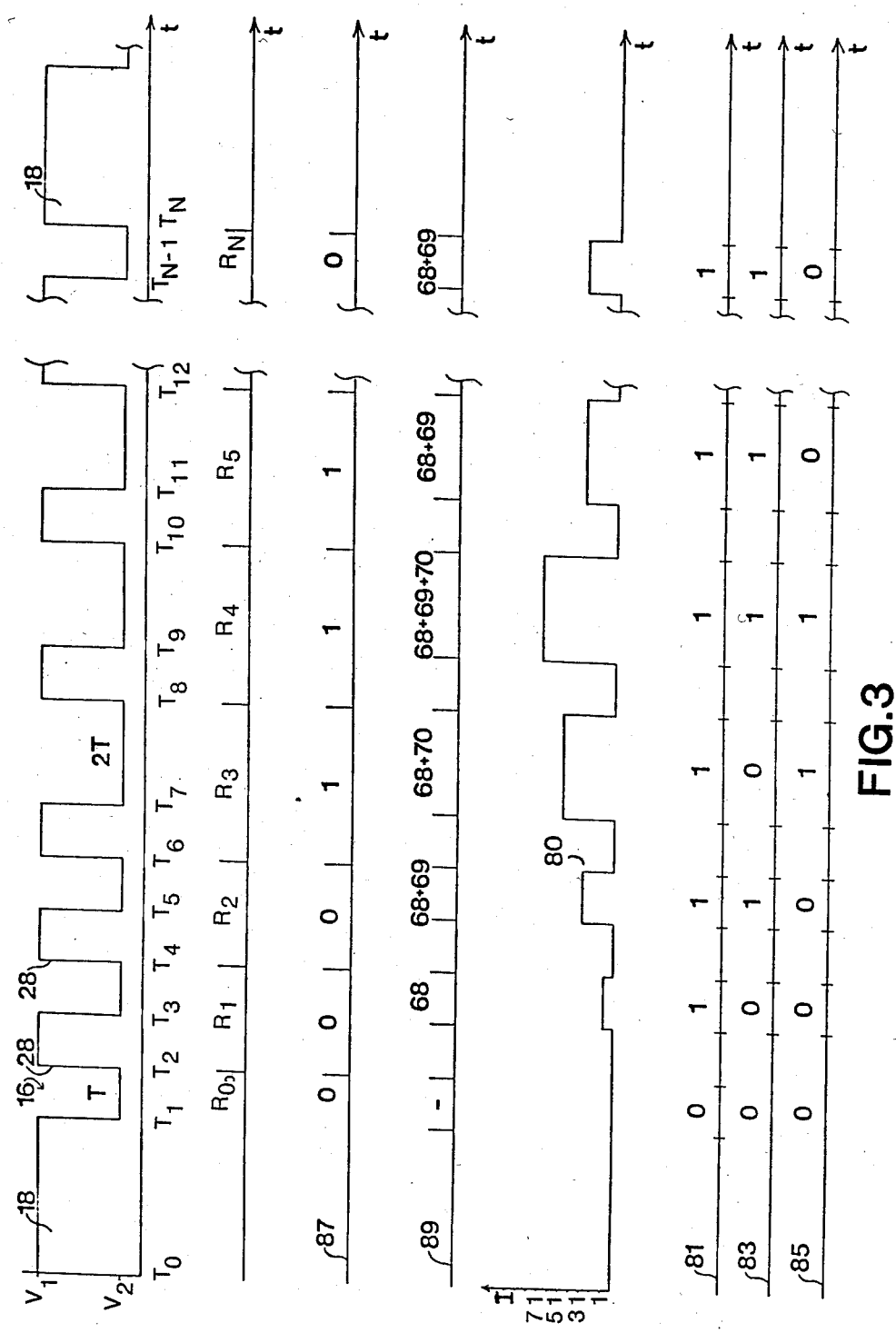
FIG. 3 illustrates various signal waveforms useful in understanding the operation of the system.

Referring first to FIG. 1, there is illustrated a system having a master station 2, a plurality of receiver stations 4 each connected in parallel to the master station 2 by means of a bus line 6 the bus line 6 preferably comprises a single pair of wires. The master station can be set manually or otherwise at its inputs 3 so as to generate control signals which control the operation of various receiver stations 4. The receiver stations 4 may have outputs 8 (see FIG. 4) which preferably comprise an output interface which is coupled to control electrical devices 9 such as lights, air conditioning, etc. The receivers may also have inputs 10 which are interfaces to sensors (not shown) which can indicate the state of some parameter being monitored. For instance, the sensor may detect smoke, heat, or the states of switches.

The system is also arranged to transmit signals from the receiver stations 4 back to the master station 2 so as to produce a response at the output of 12 of the master station 2 and/or at output of other receiver stations 4.

As shown in FIG. 2, the master station 2 includes master control circuitry 14 which generates control signals to be coupled to the bus line 6 to which the receiver stations 4 are responsive. The control circuitry 14 also includes means responsive to signals generated at the receivers 4.

FIG. 3 illustrates a control signal waveform 16 applied to the bus 6 by the circuitry at the master station 2. The control signal comprises a repetitive sequence of frames each of which is initiated by a reset pulse 18. The pulse is generated from a voltage source 20 connected to the bus 6 via switch 22. The voltage source 20 also supplies power to the master station circuitry and all the receiver stations 4 via the bus 6. The state of switch 22 is controlled by the control circuitry 14.

The reset pulses 18 are distinguished from other pulses by their duration $(T_1-T_0)$ which is controlled so as to be significantly longer than the other pulses in the frame. In the preferred arrangement, the duration of $(T_1-T_0)$ is about 10 milliseconds whereas the remaining pulses in the frame such as $(T_3-T_1)$ are about 1 millisecond in duration. To define the various pulses in the frame, the circuitry 14 maintains the power switch 22 disconnected and then reconnects the voltage source 20 to the bus 6 causing the voltage on the bus line to rise to its high level $V_1$. During the periods when the voltage source 20 is disconnected, such as the period $(T_2-T_1)$, a current source 36 maintains a voltage $V_2$ on the bus 6 via diode 38, the voltage $V_2$ being lower than the voltage $V_1$. A current monitor 40 monitors the current draw by the bus 6 during the period the bus voltage is at $V_2$. This enables information relating to the receivers to be monitored by monitoring the level of current drawn. The output of the monitor 40 is a voltage proportional to the current drawn. The current source 36 and current monitor 40 can be replaced by a voltage source and a voltage monitor respectively. The duration of the periods in which the voltage source 20 is disconnected for example $(T_2-T_1)$ or $(T_8-T_7)$ is controlled by the circuitry to be of a short period T or long period, said 2T, so that the selection of periods T or 2T can be used as a signalling function, to the various receivers as seen in diagram 87 in FIG. 3. The period T is preferably 0.3 milliseconds.

Each of the receivers 4 has an address store 30 which has the address information representative of the particular receiver. Each receiver includes receiver logic circuitry 32 which is responsive, among other things, to the rising edges 28 in the waveform 16 applied to the bus 6 by the master station 2. The receivers each effectively counts the number of such rising edges following each reset pulse 18 and this count is compared to an address number (which is different for each of the receivers) in its address store 30 and when they are equal the particular receiver identifies that it has been addressed by the master station 2. By this means the master station 2 can address each of the receiver seriatum. Thus the address information for all the receivers is effectively accomplished by means of a simple counting of the rising edges 28 following each reset pulse and matching the count with the address number in the address stores 30 of the receivers.

When a particular receiver identifies that it has been addressed by the master station 2 its logic circuitry 32 is arranged to connect one or more of electrical loads or resistors 68, 69 and 70 to the bus 6. In the preferred arrangement the load 68 is connected every time the receiver senses that it has been addressed by the master station 2, but the connection of loads 69 and 70 is dependent upon conditions at the receiver. For example, electrical load 69 is connected or not connected to the bus 6 in accordance with the state of the input 10 and electrical load 70 is connected or not connected to the bus 6 in accordance to the status 11 of the output 8, the status being indicated by an output status circuit 11 responsive to the output 8 and/or device 9, as seen in diagram 89 in FIG. 3.

The loads 68, 69 and 70 are disconnected from the bus 6 after the next rising edge 28 is detected.

The receiver being addressed also detects the duration in which the bus 6 is at voltage level $V_2$, i.e. until the occurrence of the next rising edge 28, for instance the period $(T_2-T_1)$. The receiver output 8 is controlled by its logic circuitry 32 to generate a logical value in accordance if whether or not the duration is greater or less than the predetermined period set by the control circuitry of the master control 2. This set time has a value between T and 2T preferably the mid-value, and therefore the set time is preferably 0.45 milliseconds.

Referring once again to FIG. 4, each receiver 4 has a capacitor 65 which is charged via diode 64 to voltage $V_1$ when the voltage source 20 is connected to the bus 6. The charge on the capacitor 65 supplies power to the receiver circuit when voltage source 20 is disconnected from the bus 6. Each receiver also has a comparator 63 which has a reference voltage applied to one of its inputs 50. In the preferred arrangement, the voltage $V_1$ is about 12 V and voltage $V_2$ is about 5 V. Therefore, the reference voltage is chosen to be about 8.5 V. The comparator 63 functions to translate the voltage waveform on the bus 6 so as to be suitable for the receiver logic 32. In the preferred arrangement, receiver logic 32 consists of CMOS devices which inherently have high noise immunity.

At the master station 2 the monitor 40 monitors the level of current flowing in the bus during the periods when the voltage source 20 is disconnected from the bus 6 and in this way information from the receivers is transmitted to the master station. The values of the loads 68, 69, 70 are chosen such that if load 68 only is connected across the bus 6, it would cause a current I to flow, load 69 alone would cause a current of 2I whereas load 70 alone would cause a current of 4I, which would correspond to an output of I volt, 2I volt and 4I volt at the monitor 40, as represented by waveform 80 in FIG. 3.

One example of a possible data transmission mode is illustrated in FIG. 3. As is apparent from the series of diagrams in that figure, if the output of monitor 40 is zero, corresponding to the condition that, none of the electrical loads 68, 69 and 70 is connected to the bus 6 after one of the receivers should have been addressed, that condition would indicate a fault in or at the addressed receiver. For instance in FIG. 3, the receiver $R_o$, has been shown as having produced a zero response at the monitor 40 indicating that the receiver is faulty.

During the time period $T_3$ to $T_4$ during which the receiver $R_1$ is being addressed the output of monitor 40 is I volt, as seen in diagram 80. The station 2 interprets that the receiver $R_1$ has a logical 0 at its input 10 and output status of logical 0, as seen in diagrams 83 and 85 respectively. The receiver $R_1$ interprets its output 8 to be set to logical 0. During the time period $T_5$ to $T_6$ the output of monitor 40 is 3I volt. The master station 2 interprets that the receiver $R_2$ has a logical 1 at its input 10 and output status of logical 0. The receiver $R_2$ interprets that its output 10 is to be set to logical 0. Diagram 81 shows correct interpretration of receiver status. During the time period $T_7$ to $T_8$ the output of monitor 40 is 5I volt. The master station 2 interprets that the receiver $R_3$ has at its input 10 logical 0 and output status of logical 1. The receiver $R_3$ interprets that its output is to be set to logical 1. During the time period $T_9$ to $T_{10}$ the output of monitor 40 is 7I volt. The master station interprets that the receiver $R_4$ has at its input 10 logical 1 and output status of logical 1. The receiver $R_4$ interprets that its output 8 is to be set to logical 1. During time period $T_{11}$ to $T_{12}$ the output of monitor 40 is 3I volt. The master station interprets that the receiver $R_5$ has at its input 10 logical 1 and output status of logical 0. The receiver interprets that its output 8 is to be set to logical 1. In this case, the receiver $R_5$ output is assigned a logical 1 and the master station interprets that the output status is logical 0, the master station would indicate a fault at the output 8 of receiver $R_5$ or a fault at the electrical device controlled by receiver $R_5$ if, during the previous signal frame, receiver $R_5$ output 8 is also assigned a logical 1 and the output response time which is the time it takes the output to change state is zero. If the response time is non-zero then at least this response time must lapse after the frame in which the output is first assigned a logical 1 before a fault would be indicated. This shows that when the master station 2 first detected a difference in the output status and the output assigned to a particular receiver, it must wait at least one signal frame time plus the output response time before it indicates a fault at the output 8 of that particular receiver. The signal interpretation continues until the next reset pulse 18 and then the interpretation repeats again.

Figure 5:
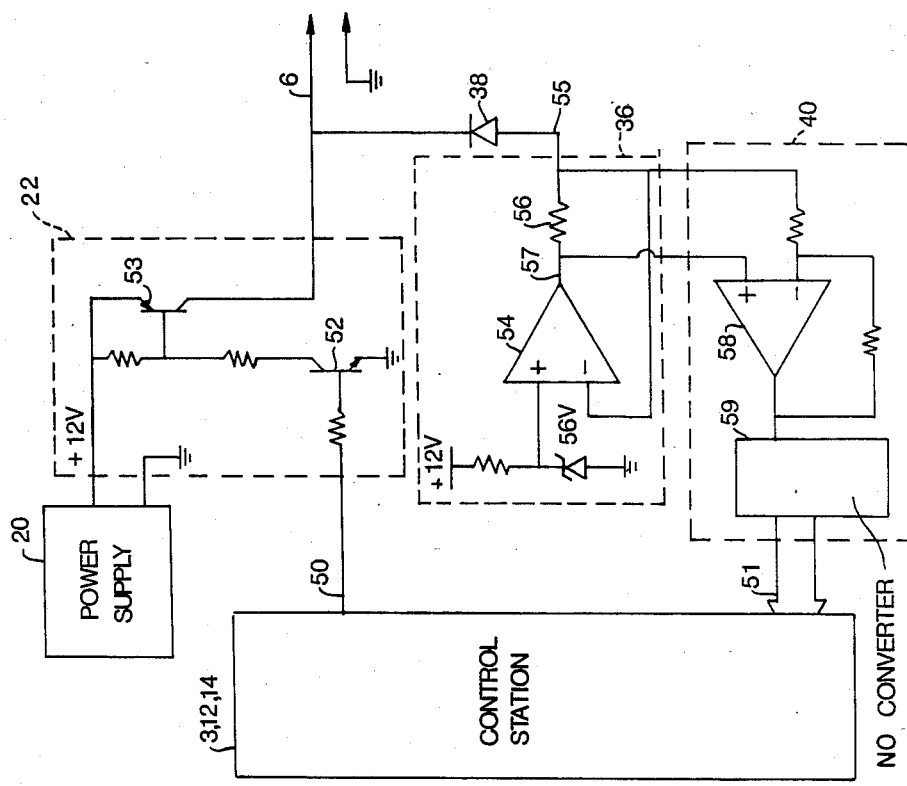
FIG. 5 is a detailed schematic diagram of the preferred master control station bus interface circuitry.

In the preferred arrangement for the master station 2, as shown in FIG. 5, the input 3 and output 12 comprises a VDU terminal whereas the control circuitry 14 comprises a microprocessor system and need not be described in detail herein. The system 14 generates a waveform 16 as illustrated in FIG. 3 and its output port 50 of 0–5 volts amplitude. The input 51 is a parallel input port of the microprocessor system 14. When the output 50 is at 5 volts it turns on transistors 52 and 53 which connect the 12 volts supply from the supply 20 to the bus 6. When the output 50 is at 0 volts, the transistors 52 and 53 are turned off removing the 12 volts supply from the bus 6. At this period, the voltage at the bus 6 is maintained at 5 volts by an amplifier 54 coupled via resistor 56 and diode 38, the waveform being illustrated in FIG. 3 as waveform 16, the voltage $V_1$ and $V_2$ corresponding to the 12 and 5 volt levels. The amplifier 54 maintains a voltage of 5.6 volts at the point 55 at all times. When one or more of the resistors 68, 69 and 70 of the addressed receiver 4 are connected to the bus 6, a current is drawn from the amplifier 54 via resistor 56 and diode 38 causing the voltage at point 57 to raise above 5.6 volts depending upon the combined impedance of the resistors 68, 69 and 70 which are actually connected to the bus 6 at the addressed receiver. The voltage across the resistor 56 is buffered and is amplified by the amplifier 58 before being applied to the input of an analogue to digital converter 59. The output of the converter 59 is connected to input 51 of the microprocessor system 14. The preferred value of the resistor 56 is 100 ohms.

Figure 6:
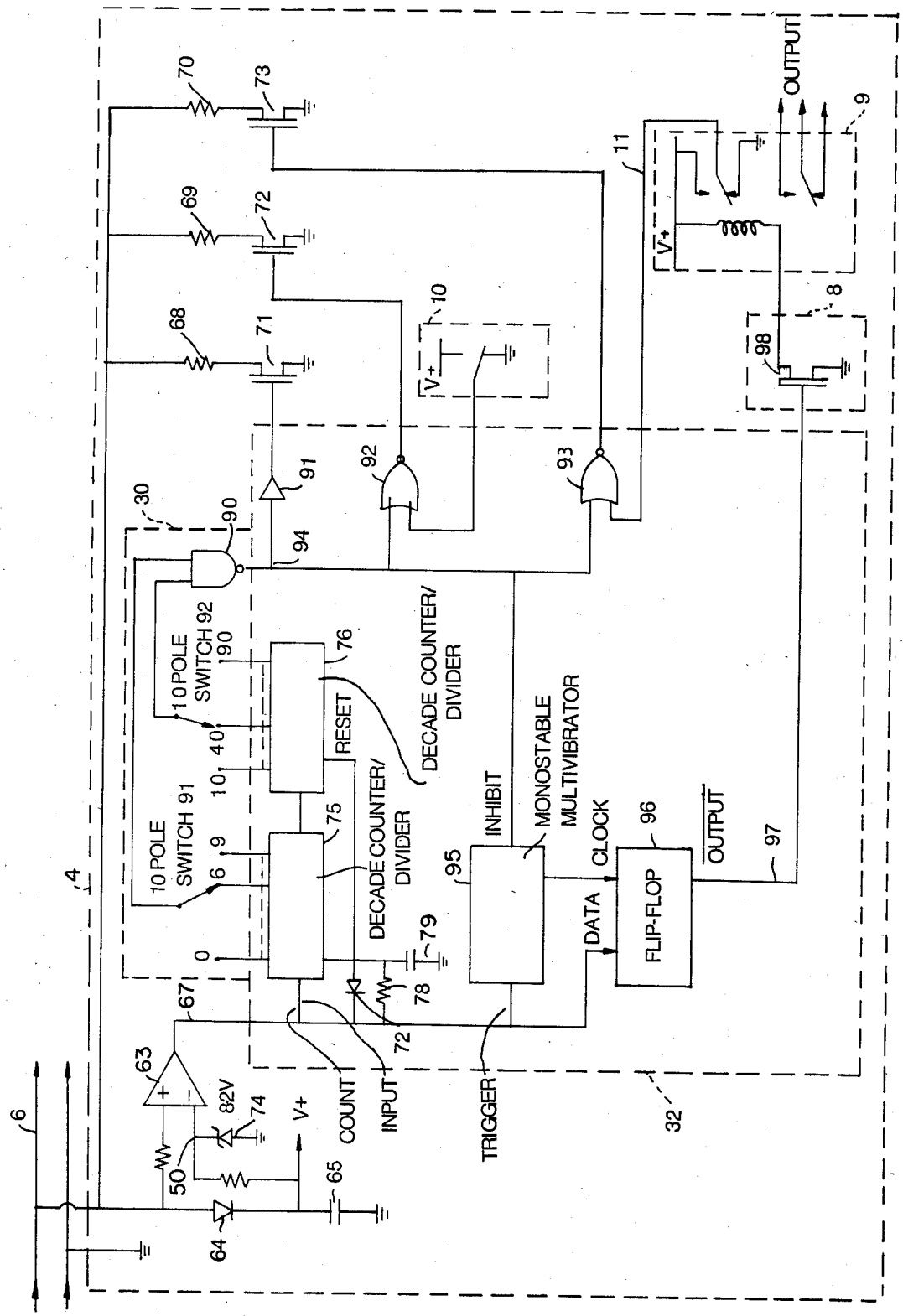
FIG. 6 is a detailed schematic diagram of the preferred receiver station.

In the preferred arrangement for the receiver 4, as shown in FIG. 6, the resistors 68, 69 and 70 are connected across the bus 6 via transistors 71, 72 and 73, respectively. The reference voltage of comparator 63 is maintained at 8.2 volts by a zener diode 74. The output waveform at point 67 us illustrated as waveform 100 in FIG. 7. The output of the comparator 63 is applied to the input of a decade counter/divider 75 which may comprise a CMOS device CD4017 and to a second decade counter/divider 76 which counts the number of rising edges 28 in the waveform 16 after being reset in accordance with the voltage on a capacitor 79. The voltage at the capacitor 79 will only attain the required level for resetting of the counter/dividers 75 and 76 during the reset period 18 of the waveform 16. The preferred value of the resistor 78 is 100k ohm and the value of the resistor 79 is 0.1 $\mu$F. In the address store 30, input to NAND gate 90 are from counter/dividers 75 and 76 via two 10-pole switches 91 and 92 which are set to a different value in accordance with the number of the receiver. In the illustrated arrangement, the switches 91 and 92 are set to indicate receiver having the address "46". The output 94 of NAND gate 90 is at zero volts only between the 46th and 47th rising edges 28 after the reset pulse, as is illustrated in waveform 102 in FIG. 7.

Figure 7:
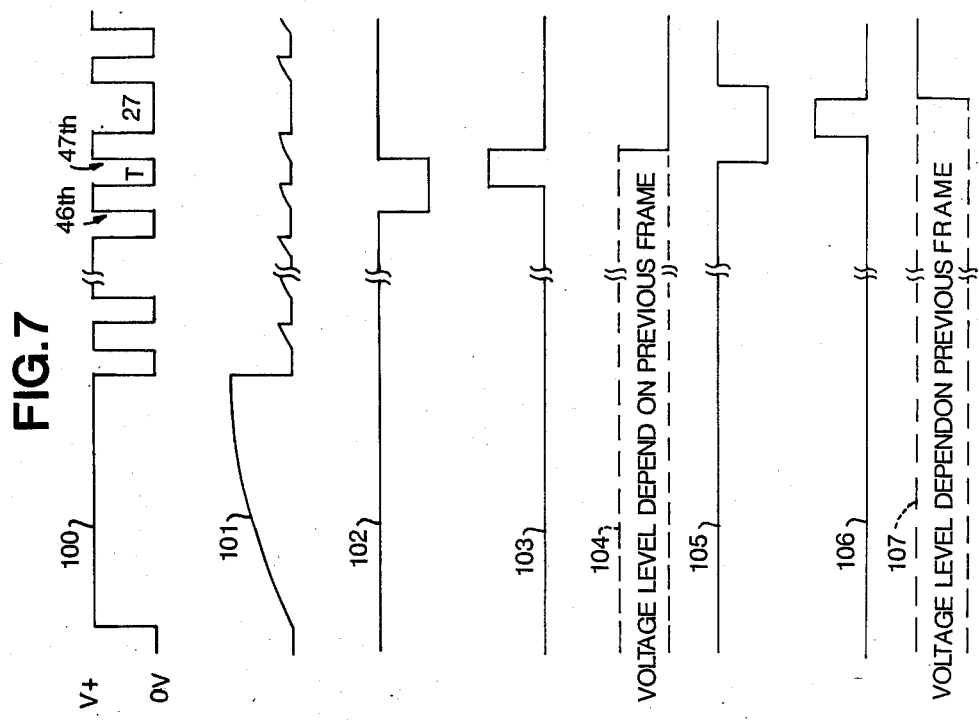
FIG. 7 illustrates various signal wave forms useful in understanding the operation of the receiver station.

When the output 94 is at 0 volts, transistor 71 is turned on via an inverter 91, thus connecting resistor 68 across the bus 6. When the output 94 and switch 10 are both zero volts, as shown in FIG. 7, the resistor 69 is connected across the bus 6 via NOR gate 92 and transistor 72.

When the output 94 is at 0 volts and the relay 9 is on, the resistor 70 will additionally be connected across the bus 6 via NOR gate 93 and transistor 73.

The output from the comparator 63 is also connected to the trigger input of a monostable multivibrator 95 and data input of flip-flop 96. The output 94 is also connected to the inhibit input of the monostable multivibrator 95. The output of monostable multivibrator 95 comprises a pulse of 0.45 ms duration when it is triggered by the falling edge of the waveform 100 (i.e. output from the comparator 63) while its inhibit is at 0 volts, as illustrated by waveform 103 in FIG. 7.

The signal at data input of flip-flop 96 is clocked by the falling edge of waveform 103. If the period when the bus 6 is at 5 volts is T then at the falling edge of the waveform 103, the data input would be at a high level, therefore the inverted output 97 of flip-flop 96 would be 0 volts as illustrated by waveform 104 in FIG. 7. For the receiver 4 with address "47" the output 97 of flip-flop 96 is at a high voltage level since the period when the bus 6 is at 5 volts is to T, as illustrated in waveform 107. When the inverted output 97 is at a high level, the relay device 9 is turned on via transistor 8, as shown in FIG. 6. The waveforms 105 and 106 correspond to the waveforms 102 and 103 except that they would be relevant to the receiver with address 47.

Figure 9:
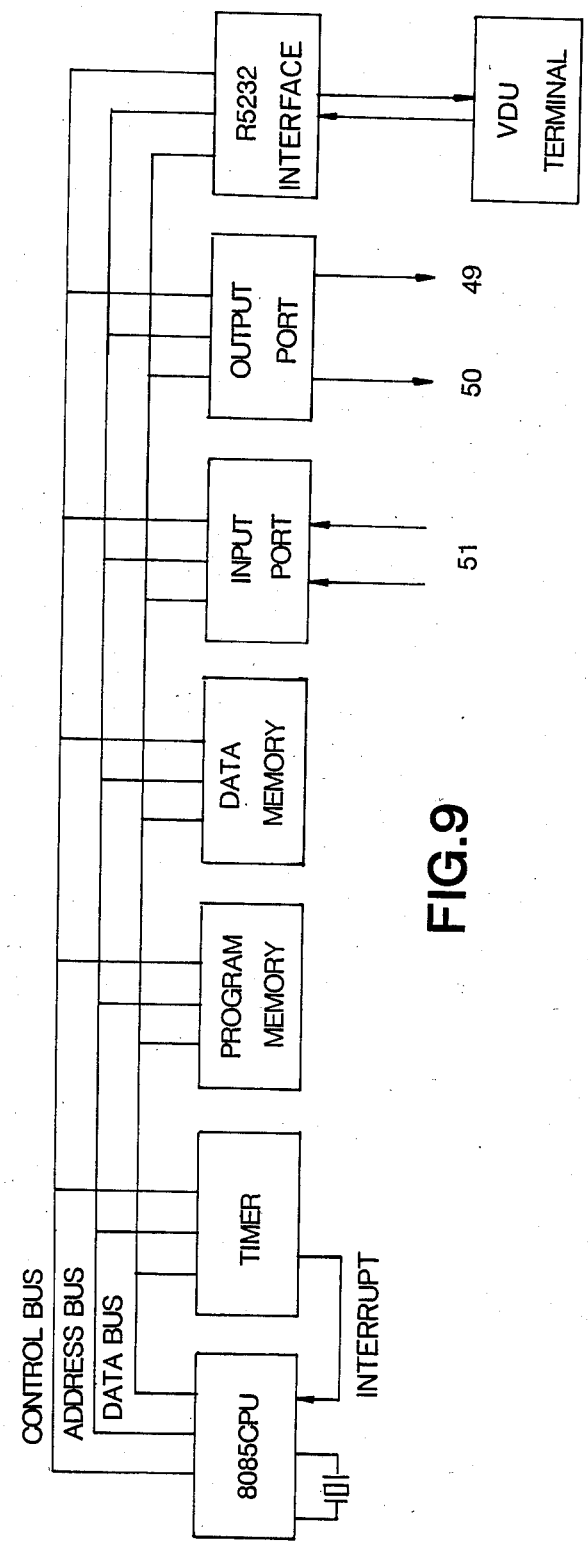
FIG. 9 is a schematic diagram of the control station.

Referring to FIG. 9, the VDU terminal display information accepts input from its keyboard and functions as interface between operator and the 8085 CPU. The timer provides the accurate timing required to generate the signal at the bus 6, via an interrupt input to the 8085 CPU at the end of the timing period. A flow chart of the program in program memory is illustrated in FIG. 10.

Figure 10:
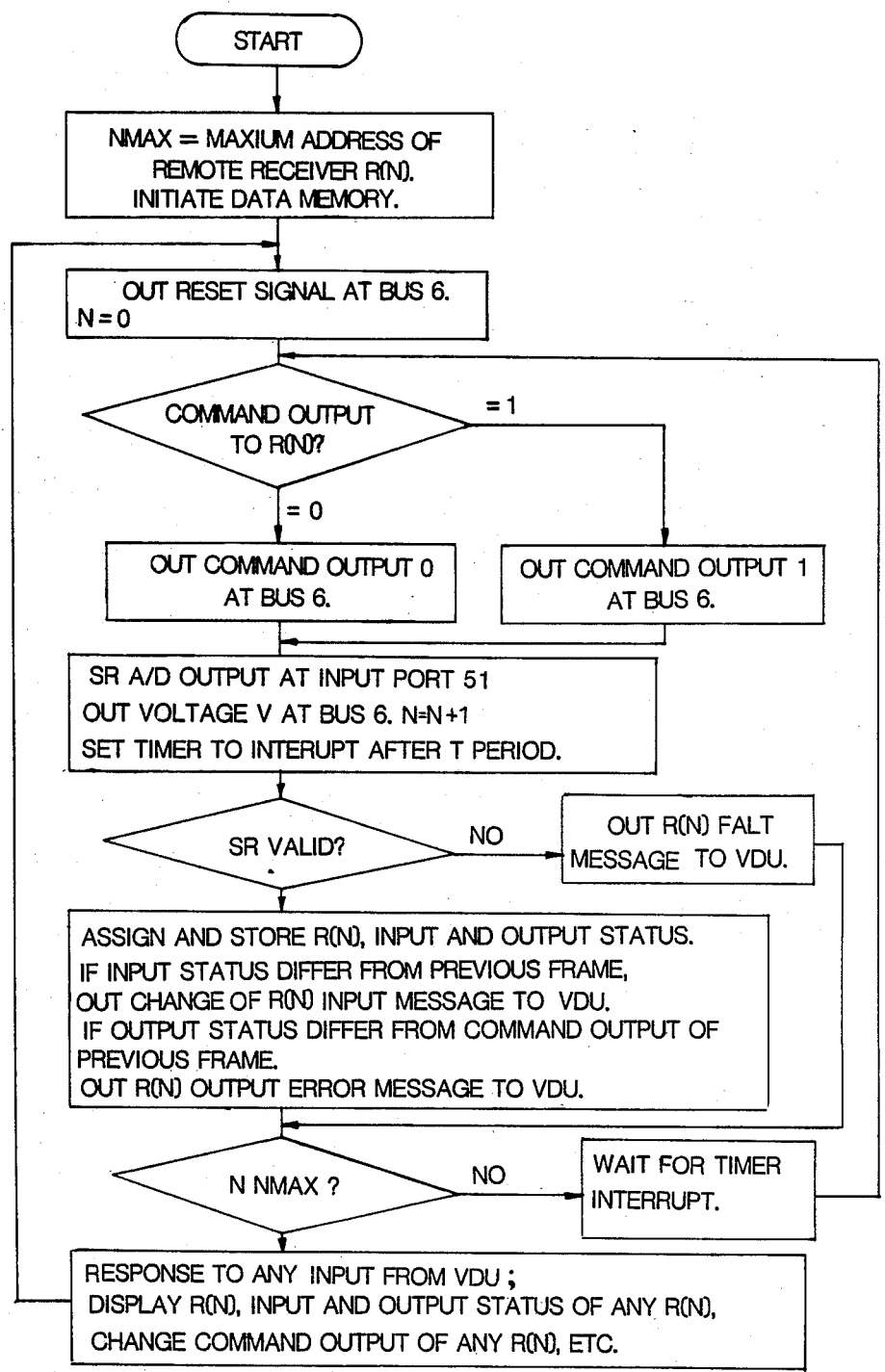
FIG. 10 is a flow chart of the microprocessor program in the control station.

In FIG. 10, R(N) represent remote receiver with address N and NMAX as the highest address. In the preferred arrangement, command output 0 is achieved by holding bus 6 at voltage V2 and T period instead of 2T period for command output 1 before the next address pulse.

Figure 11:
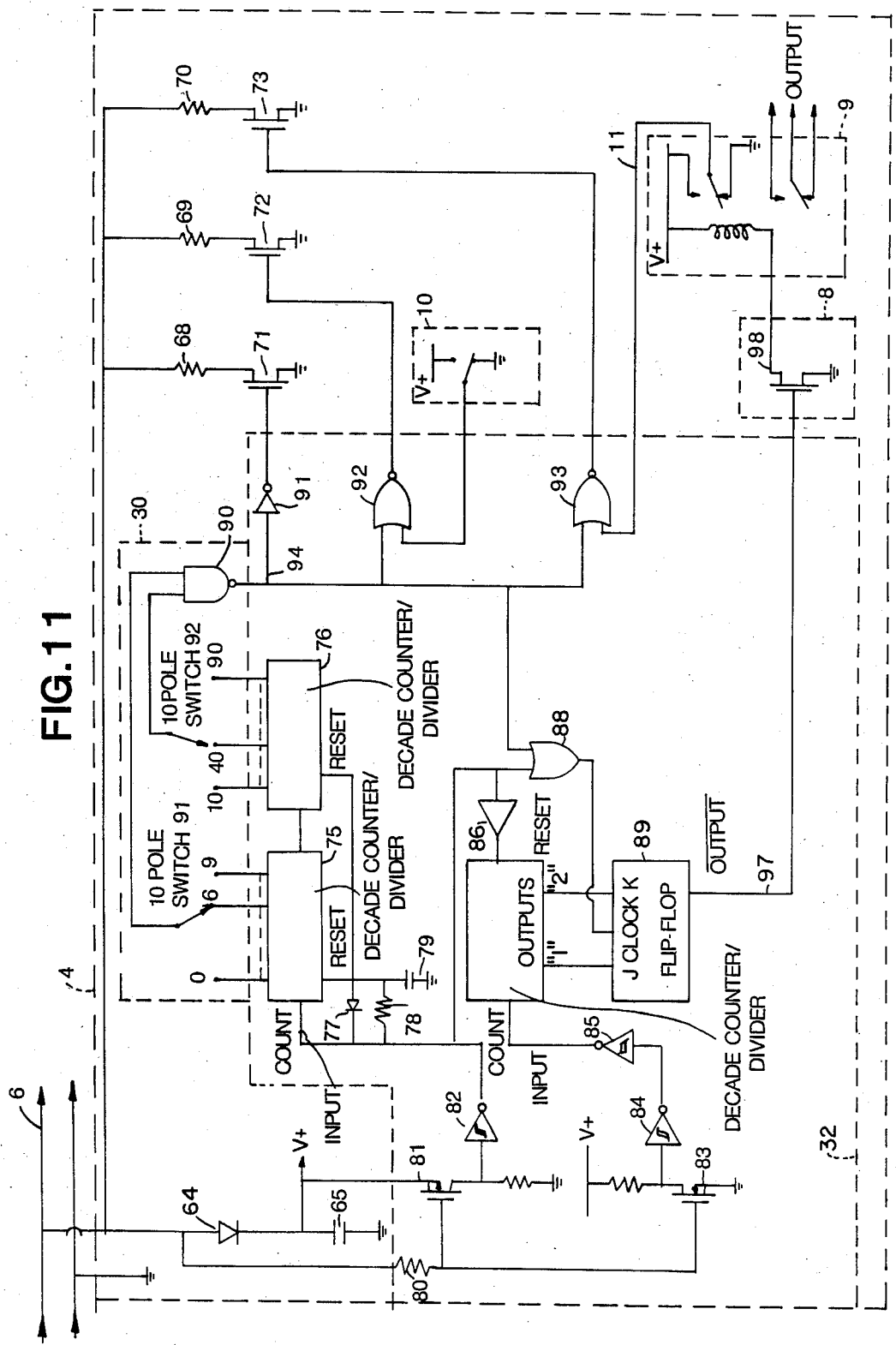
FIG. 11 is a detailed schematic diagram of the alternative remote receiver station.

FIGS. 11, 12 and 13 illustrates an alternative arrangement for transmitting command output information from the master station to the selected receiver station by varying the number of zero pulses before the next address pulse at bus 6. Referring to the alternative receiver station as shown in FIG. 11, the PMOS transistor 81 and Schmitt trigger 82 replaces the comparator 63 and zener 74 of FIG. 6. The NMOS transistor 82 and Schmitt trigger 84 and 83 decode the zero pulse at bus 6. The voltage level at bus 6 is illustrated by waveform 110 and the signal at point 99 is shown by waveform 111. The decode counter/divider 87 counts the number of zero pulses between two address pulses is reset by the address pulses via delay buffer 86. The J-K flip flop 89 is clocked via OR Gate 88. Waveform 112, 114 and 116 is the output waveform of OR Gate 88 for receiver station 46, 47 and 49 respectfully. The output at point 97 is dependent on the state of the outputs "1" and "2" of decode counter/divider 87 as illustrated by waveform 113, 115 and 117 for receiver station 46, 47 and 49 respectfully.

FIG. 12 has an additional transistor 48 and output 49 from control station compared to FIG. 5. Normally output 49 is at 0 volt. A pulse voltage at 49 during the period between two address pulses would produce a zero at bus 6.

Figure 8:
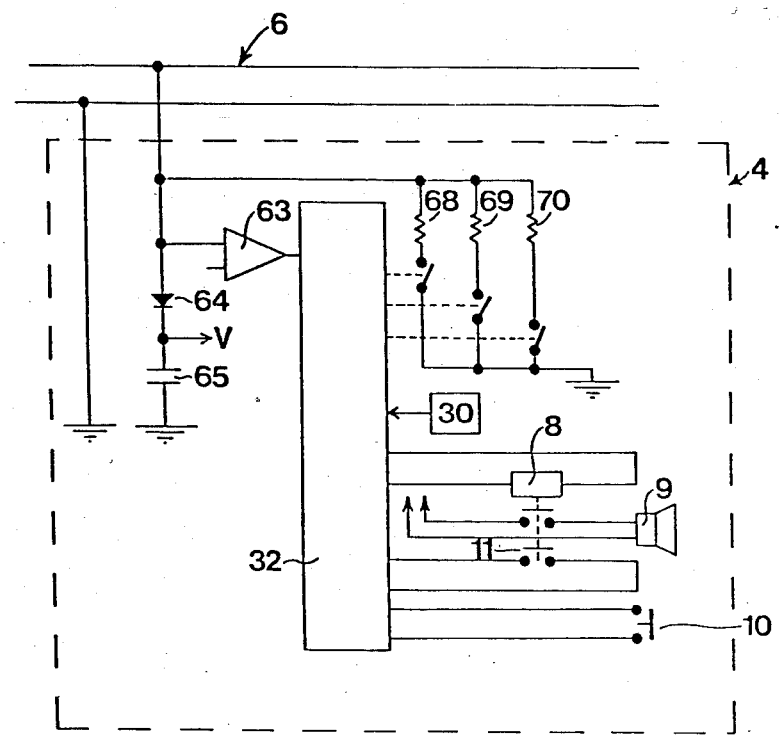
FIG. 8 illustrates schematically one example of utilization of the system.

FIG. 8 shows a simple practical utilization of the invention. In particular, FIG. 4 shows a receiver 4 which is one of a plurality of receiver units which could be located beside patients in a hospital ward, all of the receivers 4 being connected in parallel across the bus 6 as indicated in FIG. 1. In this arrangement, the input 10 could take the form of a press button which is activated when the patient requires the attention of a nurse. Activation of the press button would produce a response at the output of the master station 2. Such response could be in the form of a visual and/or audible alarm so that the appropriate action can be taken. As a further enhancement, the receivers 4 may have their outputs 8 in the form of a relay coil which operates a pair of contacts as shown. One of the contacts closes a circuit 2 to a loudspeaker which constitutes the electrical device 9 being controlled. The nurse can then speak to the patient through the loudspeaker. The second pair of contacts 11 simply monitors the fact that the relay coil has operated and therefore ensures that communication has taken place to the patient.

Many variations may of course be included in the basic system described so far, so as to reduce the effects of noise in the bus 6 and/or to enhance the basic system. Some of the variations are:

(1) to reduce or eliminate the effects of noise in the bus 6, the receivers 4 could be arranged such that they must receive in a given number of consecutive signal frames, preferably at least 2, to change their outputs before their outputs 8 change. In the same way, the master station 2 must receive in a given number of consecutive signal frames, preferably at least 2, so that a particular receiver status, its input 10 and/or output status changes, before it interprets the change and performs the required functions.

In addition, the waveform at input 67 of the circuitry 32 can also be arranged to have slow rise and fall times and the circuitry 32 includes a Schmitt trigger buffer so that any high frequency noise (for instance greater than 10 KHz) would not affect the operation of the receiver logic 32. In most applications, these enhancements would be essential where reliable operation was of vital importance.

(2) The power supply to some or all the receivers 4 can be from another source other than from the bus 6.

(3) A receiver 4 having only output but no input can have the same address as another receiver 4 having only input and no output.

(4) The number of pulses in each frame can be varied by the master station so that, for instance, those receivers 4 with lower addresses can be addressed more frequently than those of higher addresses.

(5) If a particular receiver 4 is to have more than one input and/or output then that receiver must be responsive to more than one address allowing for independent control of the inputs and outputs. For instance, if a receiver 4 has eight inputs and four outputs the receiver must respond to at least eight different addresses. The inputs and outputs do not necessarily have to have the same addresses at a particular receiver.

(6) There are two methods to transmit analog signals in the system. One method, referred to in paragraph 5 above, involves conversion of the analog signal to digital signals before transmission and after transmission reconverts the digital signals back to analog signals. Another method which only requires one address per analog signal instead of multiple addresses, is to vary the current drawn from the current source 36 in proportion to an analog signal generated at particular receivers being addressed, rather than the discrete value. For instance, a current of value I may represent an analog value of zero and 8I to represent the maximum analog value. Therefore the analog signal would cause the current to vary between I and 8I. For the master station 2 to transmit analog signals to the receivers 4, it can vary the duration in which the bus 6 is at $V_2$. For instance, a time duration of 0.3 millisecond could represent an analog signal of zero and 1 millisecond to represent the maximum analog value. Therefore the analog signal would cause the time duration to vary between 0.3 to 1 millisecond.

(7) In certain applications, where there are many devices which require multiple addresses per device, a set of addresses can be set aside to select a device and another set of addresses for the transmission of data between master station 2 and all the devices. This greatly reduces the number of addresses required to communicate between the master station and the devices.

(8) The master station can be arranged such that it allows for certain variations in the current reading from the current monitor 40 before it incorrectly interprets the signal from the receivers 4. In the preferred arrangement the variation is I/2.

(9) The pulses used for resetting, addressing and signalling could be realized by pulses of different frequencies, the resulting operation being analogous.

Many further modifications will be apparent to those skilled in the art without departing from the spirit and scope of the invention. One such modification is to mix the bus signal with other signals, such as cable TV signals, to be added to the system.

I claim:
1. An electrical control system comprising:
a master station and a plurality of receiver stations connected thereto by a bus;
said mastser station including generating means for generating control signals which are applied to said bus and to which said receiver stations are responsive;
said control signals comprising a repetitive series of signal frames, each signal frame including a reset pulse and a plurality of address pulses;
said master station also including control means which can cause selectable alteration of the duration of any address pulse and also the period between successive address pulses;
said receiver stations being respectively addressed in a frame following receipt of a predetermined number of said address pulses after the reset pulse;

the addressed receiver stations being responsive to the duration of the address pulse by which it is addressed whereby output information can be transmitted from the master station to the receiver station thus addressed;

the receiver stations including return signal generating means for generating return signals which vary the impedance of the bus;

said master station also including measuring means coupled to the bus for measuring the variation of the impedance of the bus; and the reset pulse of each signal frame being distinguishable from the other pulses thereof by virtue of its relatively long duration, the output information being determined by the duration of the period between successive address pulses and the return signals are generated by varying the bus impedance by the addressed receiver station during the same period that the receiver is addressed, whereby the master station can transmit output information to an addressed receiver station by varying the duration of the period between successive pulses and simultaneously measure the variation of the bus impedance which defines the return signal generated by the addressed receiver.

2. A system as claimed in claim 1, wherein:

said bus comprises of a minimum of two wires;

said pulses comprise of voltage pulses on a non-zero datum;

said voltage pulses can provide power for at least some of the receiver stations;

said output information is determined by the period the bus is at the said non-zero datum voltage;

said return signals comprise of varying bus impedance during the period the bus is at the said non-zero datum voltage.

3. A system as claimed in claim 1, wherein:

said bus comprises a minimum of two wires;

said pulses comprises of voltage pulses on a non-zero datum;

said voltage pulses can provide power for at least some of the receiver stations;

said output information is determined by the number of zero volt pulses during the period between said other voltage pulses;

said return signals comprise of varying bus impedance during the period the bus is at the said non-zero volt datum.

4. An electrical control system comprising:

a master station and a plurality of receiver stations connected thereto by a two-wire bus;

said master station including generating means for generating control signals which are applied to said two-wire bus and to which said receiver stations are responsive;

said control signals comprising a repetitive series of signal frames, each signal frame including a reset pulse and a plurality of address pulses;

said master station also including control means which can cause selectable alteration of the duration of any address pulse and also the period between successive address pulses;

said receiver stations being respectively addressed in a frame following receipt of a predetermined number of said address pulses after the reset pulse;

the addressed receiver stations being responsive to the duration of the address pulse by which it is addressed whereby output information can be transmitted from the master station to the receiver station thus addressed;

the receiver stations including return signal generating means for generating return signals which vary the impedance of the two-wire bus;

said master station also including measuring means coupled to the two-wire bus for measuring the variation of the impedance of the bus; and the reset pulse of each signal frame being distinguishable from the other pulses thereof by virtue of its relatively long duration, the output information being determined by the duration of the period between successive address pulses and the return signals are generated by varying the bus impedance by the addressed receiver station during the same period that the receiver is addressed, whereby the master station can transmit output information to an addressed recevier station by varying the duration of the period between successive pulses and simultaneously measure the variation of the bus impedance which defines the return signal generated by the addressed receiver.

5. A system as claimed in claim 4, wherein:

said pulses comprise of voltage pulses on a non-zero datum;

said voltage pulses can provide power for at least some of the receiver stations;

said output information is determined by the period the bus is at the said non-zero datum voltage;

said return signals comprise of varying bus impedance during the period the bus is at the said non-zero datum voltage.

6. A system as claimed in claim 4, wherein:

said pulses comprises of voltage pulses on a non-zero datum;

said voltage pulses can provide power for at least some of the receiver stations;

said output information is determined by the number of zero volt pulses during the period between said other voltage pulses;

said return signals comprise of varying bus impedance during the period the bus is at the said non-zero volt datum.

* * * * *